March 9, 1971 W. H. KING 3,568,344

FLUIDIC READOUT DEVICE

Filed Aug. 15, 1969 5 Sheets-Sheet 1

INVENTOR
WILLIAM H. KING
BY
Fritz B. Peterson

INVENTOR
WILLIAM H. KING
BY
Fritz B. Peterson

INVENTOR
WILLIAM H. KING
BY
[signature]

FLUIDIC READOUT DEVICE

Filed Aug. 15, 1969

INVENTOR
WILLIAM H. KING
BY
[signature]

INVENTOR
WILLIAM H. KING
BY
Fritz B. Peterson 3,568,344
Patented Mar. 9, 1971

3,568,344

FLUIDIC READOUT DEVICE

William H. King, Riverside, Calif., assignor to Bourns, Inc.

Filed Aug. 15, 1969, Ser. No. 850,427
Int. Cl. G09f *11/00*
U.S. Cl. 40—28 5 Claims

ABSTRACT OF THE DISCLOSURE

A device arranged to receive fluid-pressure signals via any of ten fluid lines denominated 0 through 9 and in response thereto create a visible representation of the decimal number corresponding to the line currently providing the fluid-pressure signal.

CROSS-REFERENCE TO RELATED APPLICATION

This application is related in respect of certain common subject matter to co-pending application of Richard V. Brown and Donald G. Tweed, Ser. No. 825,595, filed May 19, 1969, entitled "Fluid Diode."

SUMMARY OF THE INVENTION

A device comprising a signal-receiving or first set of stacked variously perforated plates, or equivalent, herein termed manifolding means, having a first group of passages comprising ten fluid-pressure signal-receiving fluid lines or conduits and associated manifold channels, with the channels so arranged that a pressure signal received in any particular one of the conduits is manifolded or distributed to a respective set of the channels and to branch passages connected to the passages, to provide in such passages a set of one or more secondary signals in the form of pressure pulses above the ambient, which secondary signals are transmitted via closed fluid courses herein termed risers to a second signal-distributing set of stacked variously-perforated and channeled plates or the equivalent (herein termed distributor means), the perforations and channels of which are so arranged as to distribute successive sets of secondary fluid pressure pulse signals to a respective set of openings, orifices or fluid conductor means each connected to a respective one of a matrix or array of pressure-sensitive indicator devices. The latter devices are arranged to produce visible representations of the decimal number representing in each instance a signal received on the correspondingly denominated fluid-pressure signal receiving line. Thus when a fluid-pressure signal is received in a signal-receiving conduit or line representing the decimal number 8, for example, the fluid under pressure is manifolded or distributed to a corresponding particular group or set of channels and passages and therethrough is conveyed or passed as a set of secondary or manifold signals via a unique set of the risers to a corresponding group or set of distributor conduits and branch passages provided in the signal-translating distributor means. Further, the set of secondary signals, as translated by the distributor means into a unique set of indicator signals, is applied to a particular set of the pressure-sensitive indicating devices which are arranged in a matrix or array capable of producing visible representations of any of the decimal digits 0 through 9 and which produce, in response to the set of indicator signals translated from the manifold means, a visible representation of the decimal digit 8. Avoidance of feed-back or "cross-talk" effects in conduits and passages in which, in any particular instance, effective pressure signals are not desired, is effected in any of several ways. For example, and most simply, undesirable pressure-signal effects in undesired channels and conduits are avoided entirely or attenuated to insignificant values by proper dimensioning and configuration of fluid channels and conduits, whereby fluid friction and pressure-drop prevents any "feed-back" or stray fluid-pressure signals from becoming intense enough to cause undesirable operation of indicator devices. Alternatively, use may be made, in any or all of the fluid-pressure signal passages, of "fluidic diode" means, such as that described in the aforementioned co-pending application. Still another alternative is to incorporate simple unidirectional check valves in respective passages. However, by selection of passage dimensions and/or selection of passage shape, with moderate operating pressures, generally no auxiliary means is required to avoid feed-back or false operations.

The preceding general description makes it obvious that a principal object of the invention is to provide an apparatus responsive to a fluidic signal in any of ten fluid-signal lines each line of which carries respective signals representative of a respective one of the ten decimal digits and is denoted by that one of such digits, the apparatus responding to any such signal to produce a visible decimal digit character corresponding to the decimal digit represented by such signal. Other objects and advantages of the invention are hereinafter made apparent or set out in the appended claims. The invention in a preferred exemplary physical form is illustrated in the accompanying drawings forming a part of this description.

DETAILED DESCRIPTION OF THE PREFERRED FORM OF THE INVENTION

Figures 1, 2, 3, 20:
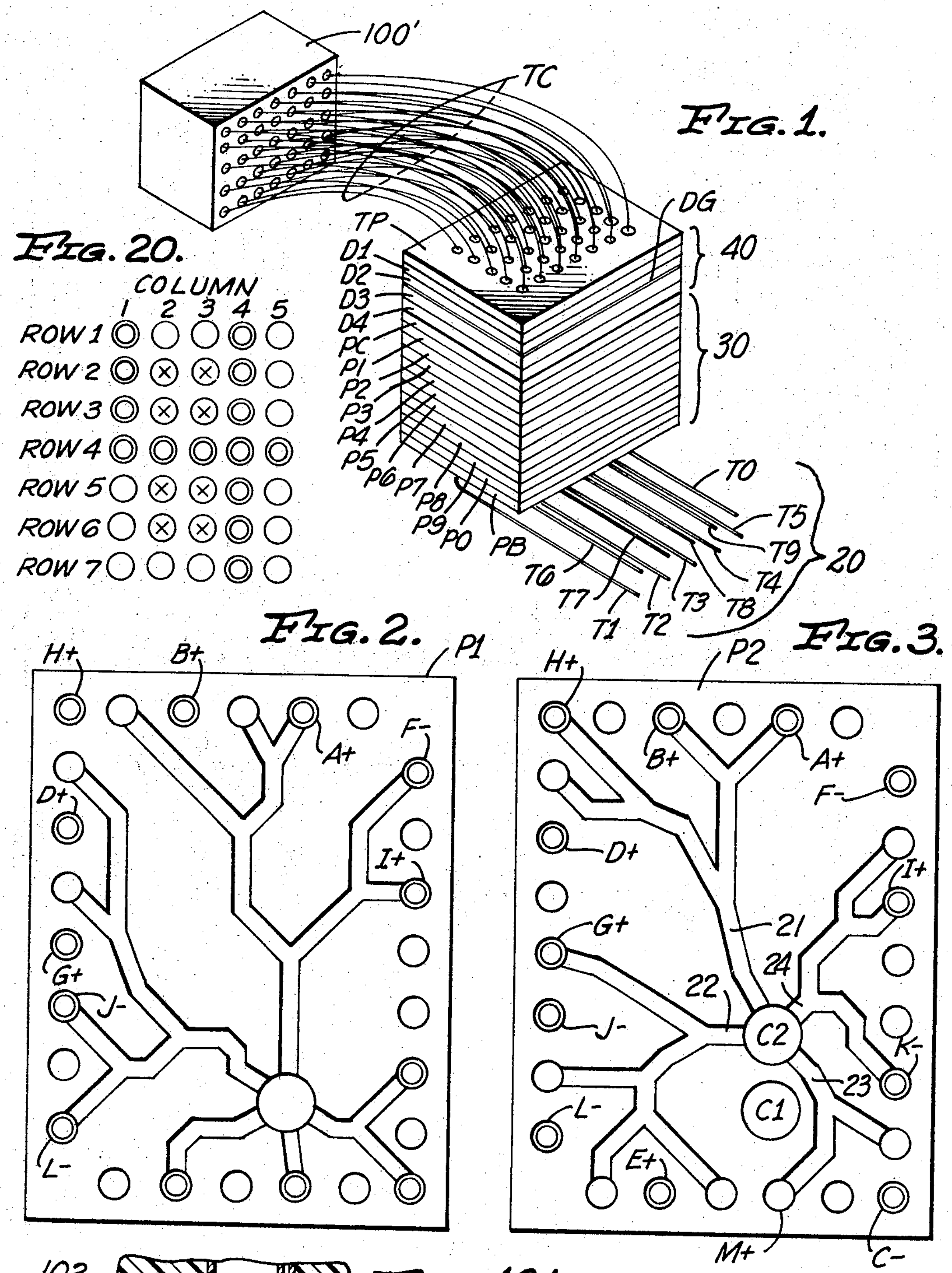
FIG. 1 is a partly diagrammatic drawing detailing relative dispositions of apparatus components in exemplary form and according to the invention.
FIGS. 2, 3, 4, 5, 6, 7, 8, 9, 10 and 11 are plan views of plates comprised in a signal manifolding means included as a component in the apparatus shown in FIG. 1.
FIG. 20 is a diagram showing a preferred geometrical form of matrix or array of indicator devices and indicating differences in characteristics of two types of devices and illustrating production by the devices of the array of an exemplary decimal digit in visible form.
Figure 16A:
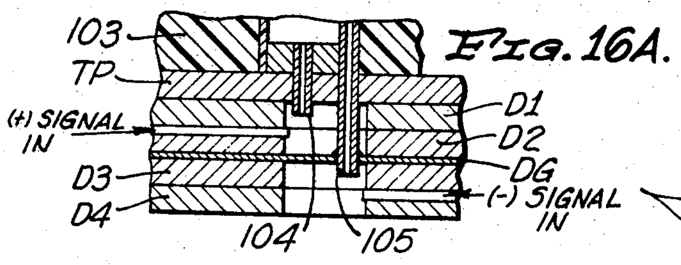
FIG. 16*a* is a fragmentary sectional view showing how negative and positive signal elements are directed to different respective passages in indicator devices.
Figure 4:
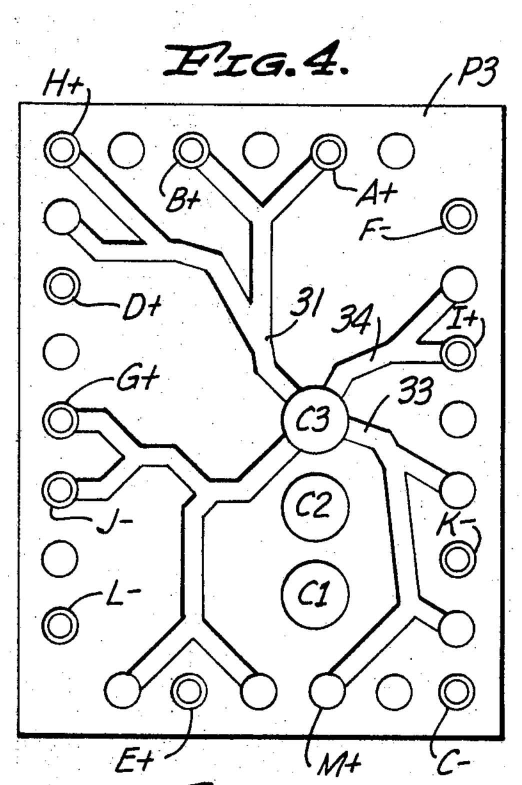
Figures 16, 17, 18, 19:
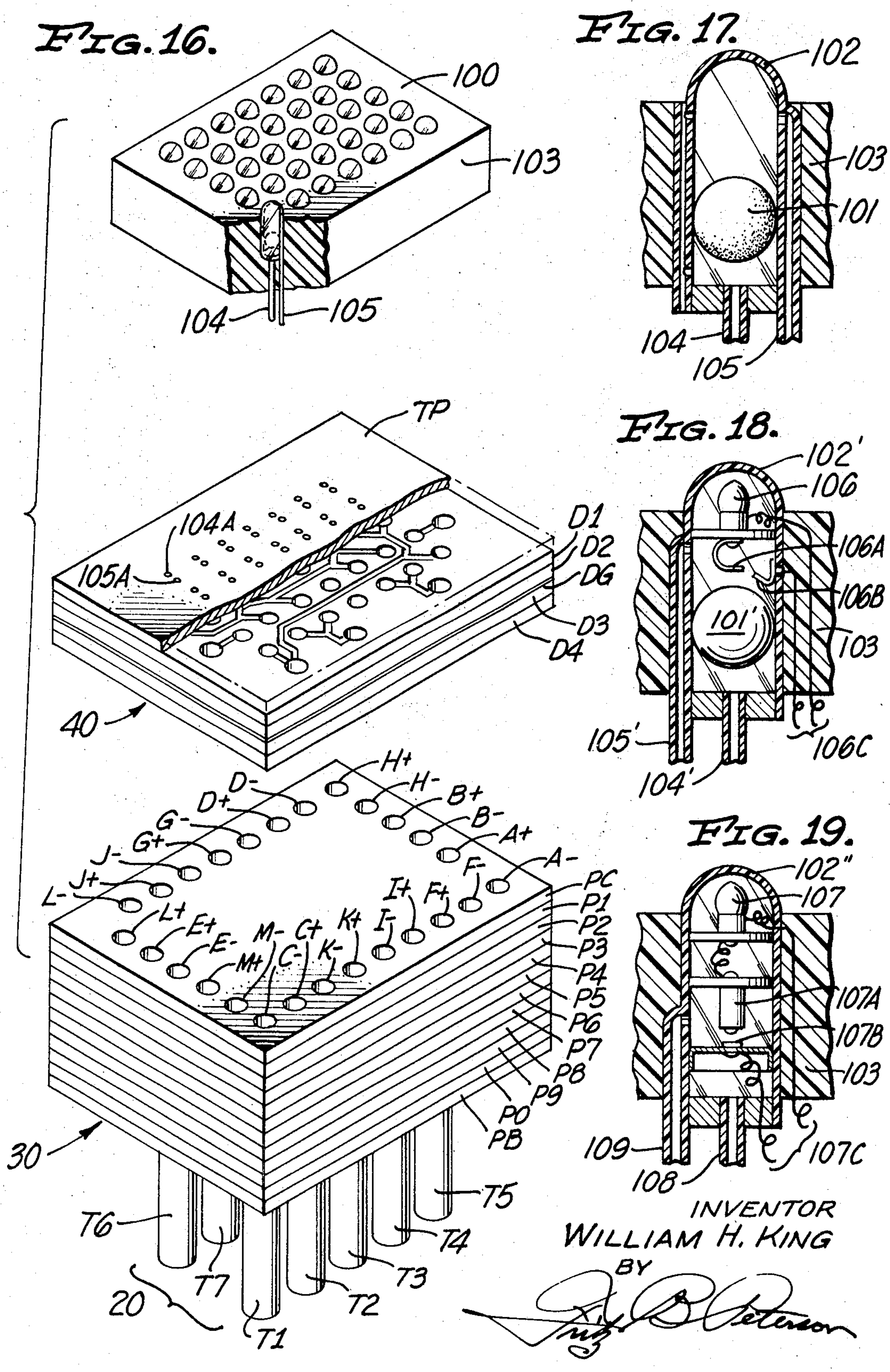
FIG. 16 is an exploded pictorial view of component groups according to the exemplary form of the invention, with portions broken away to illustrate detail, and showing an indicator matrix or array in modified form.
FIGS. 17, 18 and 19 are sectional views of pressure-sensitive indicator devices of various kinds, employed in an indicator matrix or array shown in FIGS. 1 and 16.

In FIG. 1, a fluidic signal line set 20 comprising ten input-signal lines in the form of conduits or tubes is shown, leading from a source (not illustrated) of fluid-pressure signals into a fluidic signal manifold means 30 (which means in this exemplary construction comprises a set of plates herein termed manifold plates in the interest of convenience). Each of the ten tubes of the set 20 corresponds to a respective one of the decimal digits 0, 1, 2, 3, 4, 5, 6, 7, 8 and 9, and the lines are correspondingly numbered T0, T1, T2, T3, T4, T5, T6, T7, T8 and T9. While shown as lines, and herein called lines, it will be understood that the tubes are fluid-tight conduits. The manifold plates of means 30 are ten in number, plus a base and a cover, and the active manifold plates are correspondingly numbered P1, P2, P3, P4, P5, P6, P7, P8, P9 and P0. The manifold plates are stacked in superposed relation in mutual alignment or registry as hereinafter indicated, and are adhesively or otherwise united into a unitary assembly. The individual plates of set 30 are variously perforated and have formed in their upper faces channels of various shapes, as indicated in detail in FIGS. 2, 3, 4, 5, 6, 7, 8, 9, 10 and 11. The circuit plate P0 (FIG. 11) is disposed at the bottom of the stack immediately above the base plate BP, as indicated in FIGS. 1 and 16. Plate P0 has through-holes or perforations C1, C2, C3, C4, C5, C6, C7, C8, C9 and C0 as indicated, and four branched manifold grooves or passage O1, O2, O3 and O4 formed in the upper surface of the plate and leading, via branch passages as shown, to respective sets of apertures which are comprised in upwardly-open peripheral risers. The risers are closed at their lower ends by the base plate BP, which does not have a peripheral set of riser apertures. Further, the risers are in pairs, each pair being denoted by a respective capital letter and the risers of any pair being denoted by a + or — sign following the letter. For example, the risers of pair A are denoted A— and A+. Thus manifold passage O1 of plate P0 (FIG. 11) leads to or connects with risers B+, H— and D+. Similarly manifold passage O2 connects with risers A+, F+, I— and K+. Manifold passage O4 connects with risers M+ and C+; and manifold passage O3 connects with risers G+, J+, L+ and E—.

Figure 10:
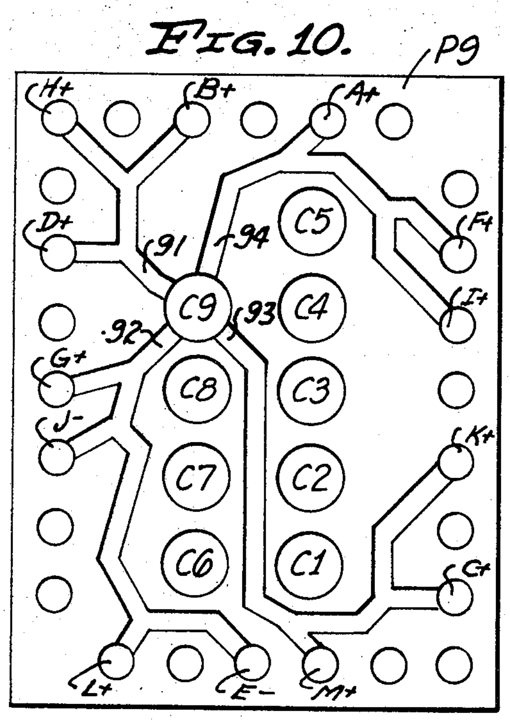
Figure 11:
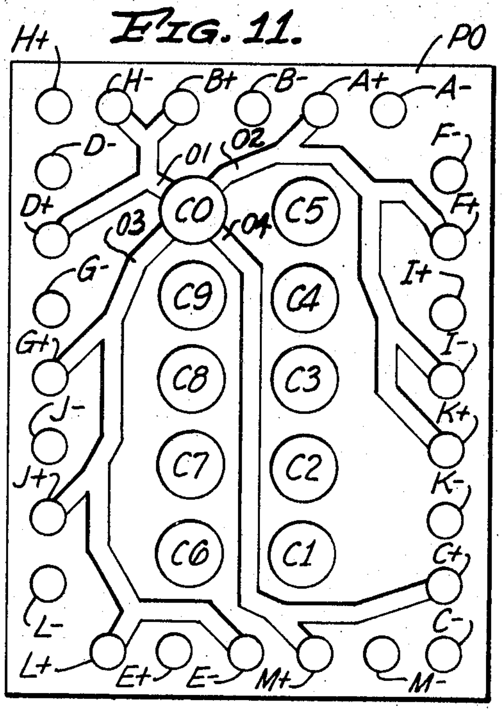
Figure 12:
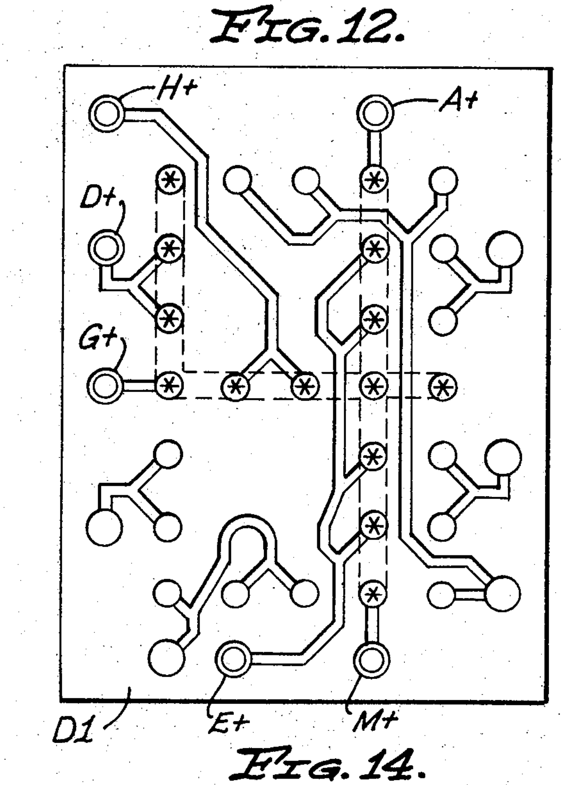
FIGS. 12, 13, 14 and 15 are plan views of plates comprised in a signal distributor means comprised in the apparatus depicted generally in FIG. 1.
Figure 13:
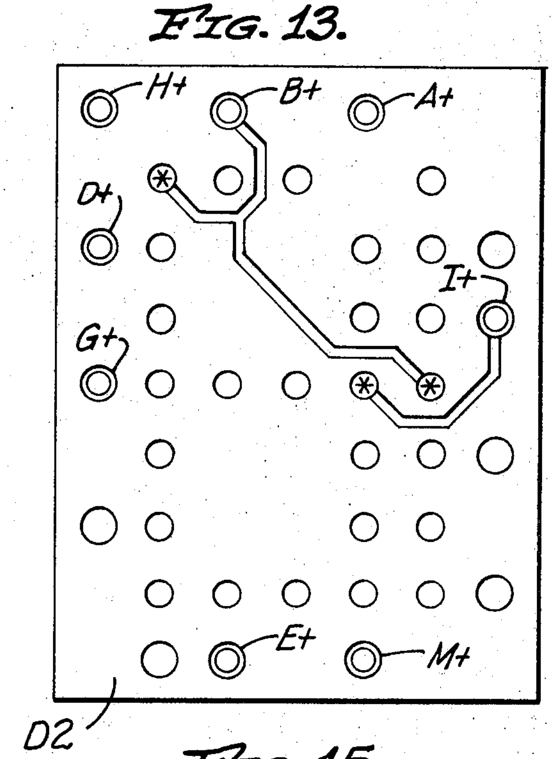
Figure 14:
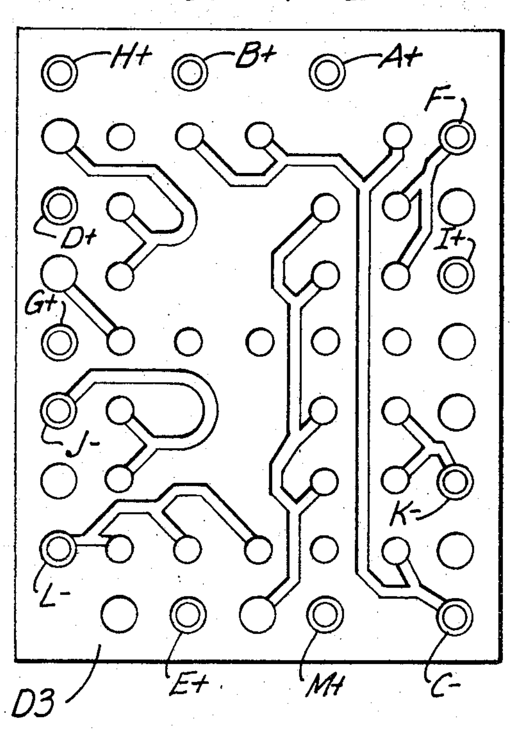
Figure 15:
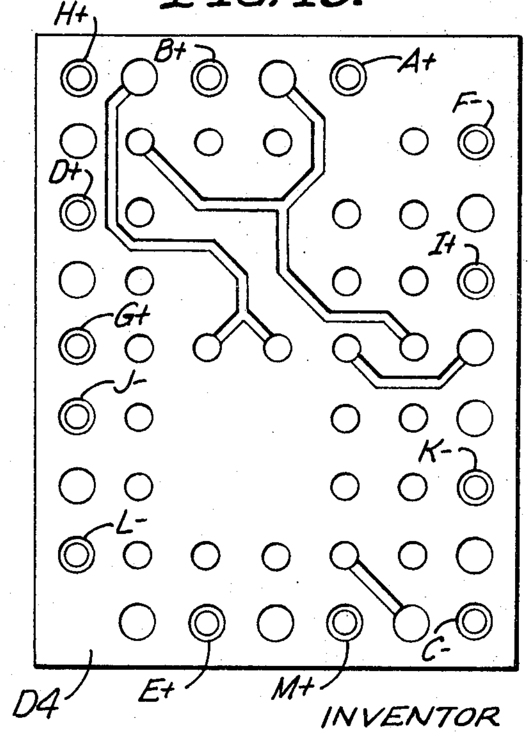

The riser-forming apertures, inlet openings or signal input ducts C1 through C0, manifold passages such as O1 through O4, and branch connections thereof to sets of risers as described in connection with FIG. 11, are, similarly, in the case of the several plates P1, P2, P3, P4, P5, P6, P7, P8 and P9 as illustrated in respective drawings of FIGS. 2, 3, 4, 5, 6, 7, 8, 9 and 10. It should be noted that in each successively higher manifold plate, progressing upward from plate P0, there is one fewer input signal duct or aperture of the set C1 through C0, than in the preceding lower manifold plate. Thus in plate P9, next above plate P0, (see FIG. 10), there is no input signal passage perforation C0, and as a consequence all fluidic signals coming into the manifold means via input signal line T0 and fed therefrom into perforation C0 in plate P0 are required to change course from upwardly to laterally, into the aforementioned manifold passages O1, O2, O3 and O4. Similarly, in plate P8 (FIG. 9) disposed next above plate P9, there is no aperture C9, and hence fluidic input signals entering from line T9 pass through the input signal passage comprising aperture C9 in plate P0, and into the registering aperture C9 in plate P9, but are then diverted laterally by the bottom face of plate P8. Thus, as indicated in FIG. 10, any input signal from line T9 is diverted from duct or passage C9 into manifold passages 91, 92, 93 and 94, and thence via branch passages to risers B+, H+, D+, G+, J—, L+, E—, M+, C+, K+, I+, F+ and A+.

Similarly, fluidic signals incoming on line T8 enter input signal duct or passage C8, are diverted laterally into manifold passages 81, 82, 83 and 84 (FIG. 9) by the superposed plate P7 which has no aperture C8, and hence pass to all of risers A+, B+, H+, D+ G+, J+ L+, E—, M+, C+, K+, I+ and F+.

From the preceding description, it is evident that input signals on line T7 pass upwardly through the duct or passage provided by apertures C7 in plates BP, P0, P9, P8 and P7 (FIG. 8), thence laterally via manifold passages 71, 72, 73 and 74 to four sets of the peripheral risers as indicated. In similar manner, the courses of input fluid signals received on respective ones of lines T6, T5, T4, etc. can be traced, with reference to respective FIGS. 7, 6, 5, etc., into respective different unique sets of the group of risers. It may be noted that duct C6 at plate P6 (FIG. 7) uses or branches into five manifold passages as does duct C5 at plate P5 (FIG. 6); however, as is evident from examination of all of the manifold plates, the number of such manifold passages utilized is a matter of choice of design of passages. For example, signals on line T4, going through the input signal duct or passage provided by apertures C4, are manifolded laterally through only three manifold passages (FIG. 5), namely 41, 42 and 43, to respective sets of the risers.

Since all of the plates P0, P1, P2, P3, P4, P5, P6, P7, P8 and P9 have perforations comprised in all of the risers, and since the manifolded fluid signals are to be utilized above the top of the stack of superimposed manifold plates P0, P1, P2, P3, P4, P5, P6, P7, P8 and P9, the lower ends of all of the risers are plugged or blocked to prevent needless attenuation of the signals. Such blocking is most conveniently effected by the base plate BP (FIGS. 1 and 16) which has no riser perforations nor lateral passages but only input signal openings C0, C1, C2, C3, C4, C5, C6, C7 C8 and C9 in which lines T0, T1, T2, T3, T4, T5, T6, T7, T8 and T9 are anchored.

From the preceding description, it is noted that any time a fluidic input signal is received on one of the ten input signal lines, the signal is manifolded to a unique set of the group of riser passages arranged around the peripheries of the plates. The risers continue upwardly through riser apertures formed in the manifold cover plate PC (FIG. 16) and into the lowermost one of a set 40 of distributor plates which possess respective unique sets of perforations and passages as indicated in FIGS. 12, 13, 14 and 15. The distributor plates are denoted, respectively, D1, D2, D3 and D4, and are superimposed on the distributor cover plate PC in the relation indicated in FIG. 1, with a specially apertured terminal or top plate TP overlying the stack of plates.

Since the objective or purpose of the described apparatus is to provide a visible indication of the decimal digit corresponding to the digital (decimal) value of the input signal received over any of the input fluid signal lines, a matrix of two-state indicator elements is provided within or by means of which a visible representation of any of the ten digits of interest can be formed. In this instance a rectangular matrix or array five elements wide and seven elements high is provided, the array being in vertical columns and horizontal rows as indicated in FIG. 20. Some of the element spaces of the array are not necessary and may be occupied by dummies, or may merely not be occupied, but preferably and as shown are each occupied by a simulated or artificial element. At each necessary position in the array a respective operable indicator element is stationed. Each element responds to a fluid signal applied thereto, changing state and providing one element of a decimal character. Thus the operable indicator elements may be fluid-pressure-sensitive switches with lamps and circuit means, the array of elements being embedded in a plate and having only the end portions of the lamps protruding or visible. Such an array is depicted in FIG. 16 at 100. Therein the elements are of the alternative type depicted in FIG. 17, wherein a fluorescent sphere 101 is arranged for translation in a transparent jacket 102 the hemispherical end of which protrudes from the base 103 of the indicator array. Fluid passages 104 and 105 communicate with respective ends of the closed chamber provided by the jacket; and the arrangement is such that when a fluidic signal in the form of a pulse of fluid under pressure is admitted via passage 104 the sphere or body 101 is moved to the exposed end of the chamber and becomes visible. When a negative fluidic signal is admitted via passage 105, the sphere or body 101 is positively moved to the lower end of the chamber and is hidden from view. Negative (—) fluidic signals derived from the — risers (such as H— and E—) are applied to passages 105, and the positive (+) fluidic signals apparent in the + risers are applied to passages 104, as is made evident in FIG. 16*a*.

The indicator elements of array 100 may take other forms, such as those illustrated in FIGS. 18 and 19. In the former, fluid-pressure actuated sphere 101′ has a conductive exterior whereby in response to a + fluid-pressure signal appearing on passage 104′ a circuit through indicator lamp 106 in the upper end of jacket 102′ is closed at contacts 106A and 106B. Power is furnished via insulated conductors 106C embedded in base 103. Negative fluid-pressure signals, if any, are applied to passages 105′, thus making certain opening of the circuit at contacts 106A and 106B. In the alternative form of electric-lamp indicator shown in FIG. 19, the pressure-sensitive switch comprises a piston-carried contact 107B which is closed with stationary contact 107A incident to arrival of a + fluid signal at passage 108. Passage 109, like passages 105 and 105′ in the previously described indicator devices, is used for transmission of negative fluidic signals. In other respects the circuit and components arrangement of FIG. 19, and operation thereof are evident from examination of the drawing, the capsule and passages being modified as indicated.

In FIG. 20 is illustrated a diagram representing the indicator array, and indicating by the symbol X the dummy indicator elements of the array, and by circles the operable elements requisite for production of any and all of the ten decimal characters 0 through 9. Illustrative of the creation of the decimal character 4 thereon, the indicators made active by reception of a signal on line T4 are indicated by concentric circles. Others of the digital characters may readily be traced on the array; however, in the interest of brevity of explanation, the unique course or sequence of fluidic signal manifolding and distribution, and indicator actions incident upon reception of a signal representing decimal number 4 on line T4 only, will be carried through in detail by way of example. It should be noted that the indicator array base or body 103 may be plugged directly into the plate TP of the distributor unit 40 as indicated in FIG. 16, since the plate TP is provided with dual or paired apertures the negative one of each pair being passed through a gasket-like separator DG and thence connected to a respective aperture in plate D3, and the other of each pair communicating directly with a respective aperture in plate D1 (FIG. 12) of the distributor unit. Alternatively, the indicator array may be located remote from the distributor unit, as indicated in FIG. 1, the passages being interconnected by respective tubes of a set TC. In this arrangement, the negative-signal tubes pass through plates D1 and D2 and through gasket-like separator DG and into the — signal risers, whereas the + signal tubes connect directly with the + risers at plate D1. The exemplary action of the apparatus upon reception of a signal on line T4, representing decimal number 4, will now be described.

Figure 5:
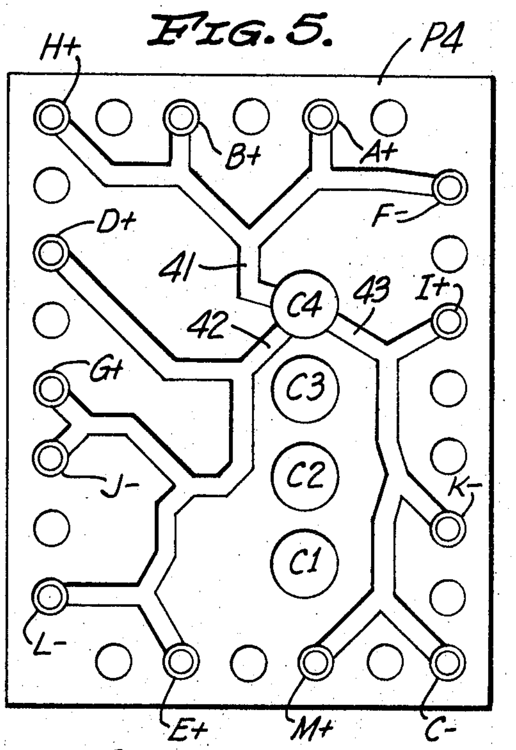
Figure 6:
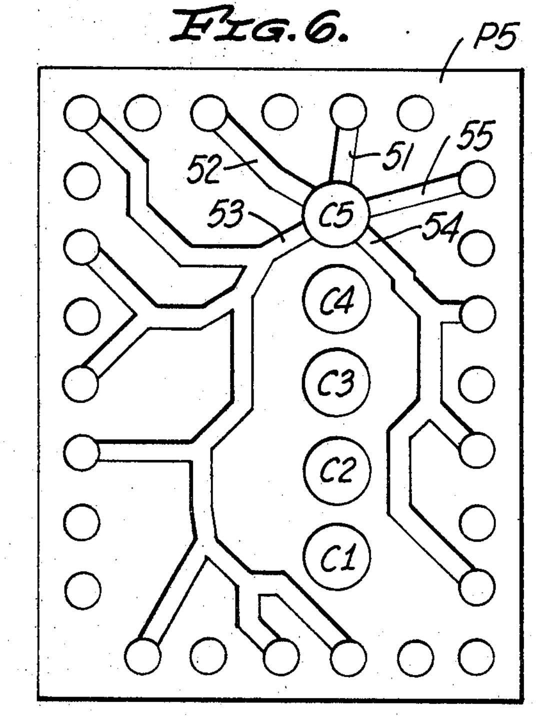
Figure 7:
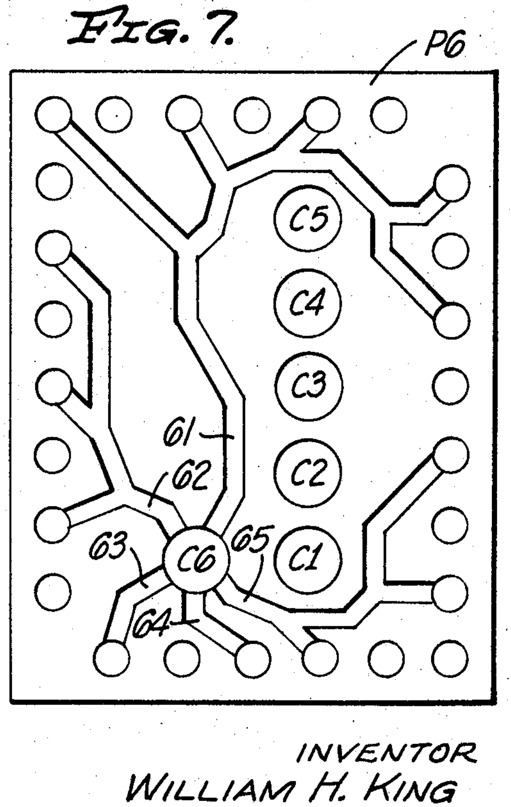
Figure 8:
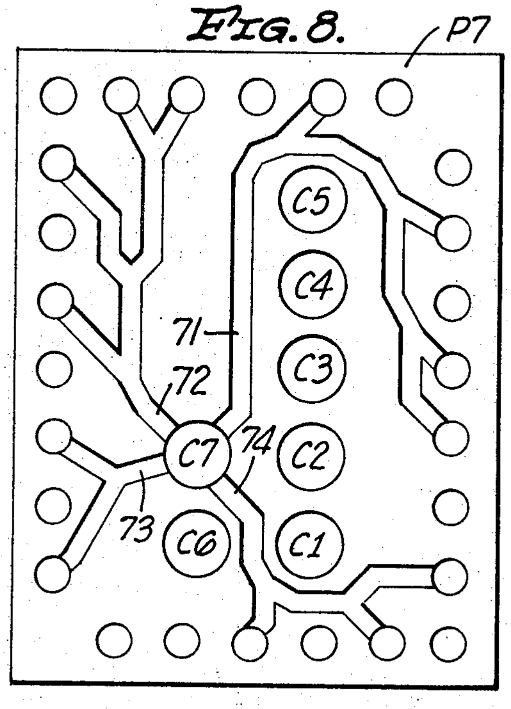
Figure 9:
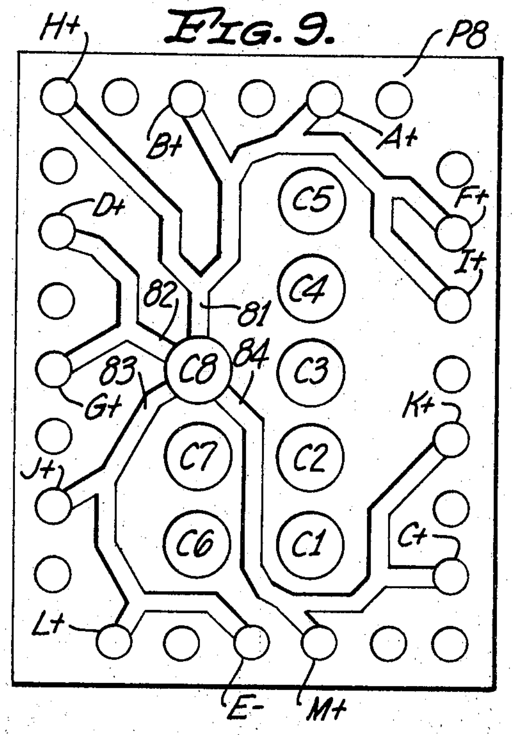

The fluid-pressure pulse or fluidic signal representative of the numeral 4, hereinafter called the T4 signal for convenience, and which signal is received via conduit signal line T4 (FIGS. 1 and 16) passes into aperture C4 of base plate BP, therethrough upwardly into and through aligned apertures C4 of manifolding plates P0, P9, P8, P7, P6 and P5 (FIGS. 11, 10, 9, 8, 7 and 6, respectively), from neither of which can it escape laterally, and into aperture C4 of plate P4 (FIG. 5). There plate P3 prevents further direct upward transmission of the T4 signal, and diverts or manifolds the signal laterally into passages 41, 42 and 43. From the latter passages the signal proceeds by way of the three sets of branch passages into each riser of the unique riser set A+, B+, H+, D+, G+, J—, L—, E+, M+, C—, K—, I+ and F—, as indicated. As an aid in tracing the T4 signal upwardly through the plate apertures constituting the risers, each aperture through which the signal is conveyed, in each of plate P4 and plates thereabove is denoted by a circle formed in the respective aperture. Thus all of the risers at and above plate P4 and in which the T4 signal appears are shown or indicated by concentric circles, as is evident in FIG. 5.

Continuing with the tracing of the course of the T4 signal, following division or manifolding of the signal at plate P4 into the noted unique set of riser passages, the signal is conveyed upwardly as an increase in pressure above the ambient in each of the set of risers, through the cover plate PC and into the distributor unit comprising plates D1, D2, D3 and D4. Examination of the lowermost two of the latter plates, namely D4 and D3, in FIGS. 15 and 14, respectively, makes it evident that the T4 signal is transmitted directly through plate D4 in which the entire group of riser apertures is present; and similarly the signal enters plate D3 in which all of the active T4 signal risers are represented by respective apertures. At plate D2, however, the T4 signal elements therebelow in risers J—, L—, C—, K— and F— are blocked, there being no corresponding apertures for those risers in that plate. The negative elements of the T4 signal are thus diverted via lateral channels formed in plates D3 and D4 to negative signal passages 105 of applicable indicator devices. The negative signal tubes 105 of the indicator devices are longer than the positive signal tubes 104, thus passing through plates D1 and D2 and into plate D3. Feedback from plate D3 to D2 is prevented by the gasket plate DG containing only riser apertures and small feeder holes to accommodate the — signal tubes 105. At the points of passage of tubes 105 through the gasket, a suitable cementing material is preferably applied to form a fluid-tight seal. This is illustrated in FIG. 16*a*. In this manner, any indicator device not needed to form the numeral 4 receives a negative signal element via plate D3 or D4 through passages 105, while indicator devices needed to form the numeral 4 receive a + signal element via plates D1 or D2 through passages 104.

To further trace the positive elements of the T4 signal, that is, those in risers A+, B+, H+, D+, G+, E+, M+ and I+, each thereof passes through a respective riser aperture in gasket DG and into plate D2. As will presently be explained, those T4 signal elements are distributed to indicator lines such that the decimal number 4 is made to appear in the indicator array 100.

The array 100 of indicator devices shown in FIG. 16 may be said to comprise five columns and seven rows of devices, as indicated in FIG. 20. As indicated in the latter figure, for the numeral 4 to appear on the array, activating + signal elements must appear at the indicator devices of rows 1, 2, 3 and 4 in column 1, at devices of row 4 in columns 2, 3 and 5, and at all seven devices in column 4. Designating the indicator devices by the appropriate column (C) number and row (R) number at which they are individually located (for example, C1–R1 for column 1, row 1), it may be seen from examination of plate D2 in FIG. 13 that the T4 signal element in riser B+ will be translated to and will energize or activate devices C1–R1 and C5–R4, and that the T4 signal element in riser I+ will activate device C4–R4, since the passages for those indicator positions are open into and through overlying plates D1 (FIG. 12) and TP. Further, from examination of plate D1, it is noted that the T4 signal element in riser A+ will activate indicator C4–R1, that the element in riser H+ will activate indicators C2–R4 and C3–R4, the element in riser D+ will activate indicators C1–R2 and C1–R3, the element in riser G+ will activate C1–R4, that in riser E+ will activate C4–R2, C4–R3, C4–R5 and C4–R6, and that in riser M+ will activate C4–R7. Thus all of the indicators shown active in FIG. 20, displaying numeral 4, are made active by the received digit-representing signal apparent in input signal line T4; and the remainder of the energizable indicator devices will be held positively in the non-indicating position or mode by respective — signal elements distributed via plate D3. To aid in the clear portrayal of the active indicator signal passages in this example, those conveying the T4 pressure pulse signal elements are denoted in FIGS. 12 and 13 by an asterisk placed in the circle that represents the aperture passage to the respective indicator.

Using as exemplary the preceding detailed explanation of the actions of the manifold plates, distributor plates and indicator devices in translating a fluidic signal on line T4 into a visible representation of the decimal number 4, the similar actions in translating any incoming signal on another of the input signal lines into a visible representation of the corresponding number are readily traced.

As is made evident in FIG. 1, the signal-element-channel array, in five columns and seven rows as shown in the upper distributor plate D1 and in cover plate TP, may be connected to a remotely located indicator array 100' by a set of conduits TC, as well as by the alternative direct connection illustrated in FIG. 16 and in which latter case the indicator signal passages 104 and 105, in the form of tubes, project into respective apertures such as 104A, 105A provided in the cover plate TP. In either case, the objects of the invention are fully attained.

I claim:

1. A fluidic readout device for converting fluidic pressure-change signals incoming via a set of N fluidic signal lines each assigned to a respective one of a set of N mathematical characters, and the signals incoming upon any of such lines each representing a respective one of the noted characters and said pressure-change signals being received individually and serially in time via said set of lines, said device comprising, in combination with a set of fluidic signal lines N in number:

first means, including fluidic manifold means having N signal input passages each connected to a respective one of said signal lines and each having branch passages effective to divide a pressure-change signal incoming on the line thereto connected into a plurality of concurrent fluidic signal-elements, said first means further including a group of passages each communicating with a respective unique set of said branch passages for receiving and conveying fluidic signal-elements received from the branch passages thereto connected;

second means, including fluidic signal-element distributing means having a group of passages each connected to a respective one of said group of passages of said first means for receiving respective fluidic signal-elements therefrom and each further connected to a unique set of one or more indicator-signal passages for translation of respective fluidic signal-elements to the unique set of indicator-signal passages thereto connected; and third means, including a geometric array of indicator devices each effective when activated to provide a visible indication of activation thereof, said array of indicator devices being so arranged as to permit to be exhibited thereon a visible representation of any of said N characters in a geometric form unique to that character, said third means including means forming fluidic signal-element receiving passages and indicator activating means, connected to said indicator-signal passages and effective to cause activation of unique respective sets of said indicator devices incident to translation thereto of respective unique sets of fluidic signal elements, whereby incident to reception of a fluidic pressure-change signal via any one of said set of fluidic signal lines, a visible representation of the mathematical character represented by the received signal is created on said array of indicator devices.

2. A device according to claim 1, in which said first means includes an integrated stack of superposed plates N in number, the lowermost of which comprises N incoming-signal passages each connected to a respective one of said N fluidic signal lines, and in which successive plates above the lowermost thereof comprise, successively, one less incoming-signal passage than the next lower plate therebelow, and in which each of said plates has a peripherally-disposed set of apertures comprised in fluidic-signal passages constituting said group of passages of said first means.

3. A device according to claim 1, in which said indicator devices each comprise an elongate chamber and reciprocable means in the chamber responsive to fluidic signal pressure-changes distributed thereto to be activated thereby to move to one or another of first and second extreme positions in the first of which only a visible indication of activation thereof is produced as a consequence of such movement to that extreme position.

4. A device according to claim 1, in which N is equal to and representative of ten and said mathematical characters are 0, 1, 2, 3, 4, 5, 6, 7, 8 and 9.

5. A device according to claim 1, in which said fluidic manifold means and said fluidic signal-element distributing means are comprised principally of respective stacks of plates each having a unique set of perforations and a unique set of lateral fluid passages interconnecting two or more of the perforations, and certain of perforations in a plurality of next-adjacent plates being in registry and providing fluidic-signal passages in conduit form.

References Cited

UNITED STATES PATENTS

| | | | |
|---|---|---|---|
| 3,091,876 | 6/1963 | Cole | 40—28 |
| 3,363,347 | 1/1968 | Benson | 40—28 |
| 3,405,464 | 10/1968 | Simson | 40—28 |
| 3,413,744 | 12/1968 | Bowles | 40—28 |

ROBERT W. MICHELL, Primary Examiner

W. J. CONTRERAS, Assistant Examiner